United States Patent
Jain et al.

(10) Patent No.: US 6,510,167 B1
(45) Date of Patent: Jan. 21, 2003

(54) METHOD FOR ACTIVELY MODELOCKING AN ALL-FIBER LASER

(75) Inventors: Ravinder Jain, Albuquerque, NM (US); Balaji Srinivasan, Albuquerque, NM (US)

(73) Assignee: Science & Technology Corporation @UNM, Albuquerque, NM (US)

( * ) Notice: Subject to any disclaimer, the term of this patent is extended or adjusted under 35 U.S.C. 154(b) by 149 days.

(21) Appl. No.: 09/667,526

(22) Filed: Sep. 22, 2000

Related U.S. Application Data

(60) Provisional application No. 60/155,137, filed on Sep. 22, 1999.

(51) Int. Cl.[7] .............................................. H01S 3/30
(52) U.S. Cl. .............................. 372/6; 372/102; 372/18; 372/26
(58) Field of Search .................... 372/6, 102, 18, 372/26, 28, 32

(56) References Cited

U.S. PATENT DOCUMENTS

| | | | | |
|---|---|---|---|---|
| 4,504,950 A | | 3/1985 | Au Yeng | |
| 5,305,335 A | * | 4/1994 | Ball et al. | 372/6 |
| 5,509,022 A | | 4/1996 | Lowery et al. | |
| 5,546,414 A | | 8/1996 | Pfeiffer | |
| 5,561,675 A | * | 10/1996 | Bayon et al. | 372/6 |
| 5,666,372 A | * | 9/1997 | Ball et al. | 372/6 |
| 5,696,779 A | | 12/1997 | Welch et al. | |
| 5,724,164 A | | 3/1998 | Lowenhar et al. | |
| 5,812,567 A | | 9/1998 | Jeon et al. | |
| 5,812,711 A | | 9/1998 | Glass et al. | |
| 5,870,417 A | * | 2/1999 | Verdiell | |
| 5,937,120 A | * | 8/1999 | Higashi | 372/102 |
| 5,987,200 A | | 11/1999 | Fleming et al. | |
| 5,999,545 A | | 12/1999 | Jeon et al. | |
| 5,999,546 A | | 12/1999 | Espindola et al. | |
| 5,999,671 A | | 12/1999 | Jin et al. | |
| 6,041,070 A | * | 3/2000 | Koch et al. | 372/6 |
| 6,181,465 B1 | * | 1/2001 | Grubb et al. | 372/6 |
| 6,370,180 B2 | * | 4/2002 | Zenteno | 372/96 |
| 2002/0015433 A1 | * | 2/2002 | Zimmermann | 372/96 |

* cited by examiner

*Primary Examiner*—Leon Scott, Jr.
(74) *Attorney, Agent, or Firm*—Jagtiani + Guttag

(57) ABSTRACT

An improved method and apparatus for mode-locking a fiber laser at a pre-selected frequency wherein a doped fiber segment contains a narrowband FBG and an electro-optically tuned FBG, thereby making obsolete the need for an EOM to modulate the laser's wavelength. The present invention also provides a method and apparatus for mode-locking a fiber laser at a variable frequencies wherein a doped fiber segment contains two electro-optically tuned FBG's. The electro-optically tuned FBG may be fabricated by a thermal poling process.

34 Claims, 5 Drawing Sheets

METHOD FOR ACTIVELY MODELOCKING AN ALL-FIBER LASER

CROSS-REFERENCE TO RELATED APPLICATIONS

The present application is based on U.S. Provisional Patent Application, Serial No.: 60/155,137, filed Sep. 22, 1999. the entire disclosure and contents of which is hereby incorporated by reference.

This application refers to the following related U.S. Patents, U.S. Patent Applications, and U.S. Provisional Patent Applications: U.S. Ser. No.: 09/448,869, entitled "Precisely Wavelength-Tunable and Wavelength-Switchable Narrow Linewidth Lasers," filed Nov. 24, 1999; U.S. Ser. No.: 09/246,125, entitled "Tunable Bragg Grating and Devices Employing the Same," filed Feb. 8, 1999; U.S. Ser. No.: 09/302,839, entitled "Highly Doped Fiber Lasers and Amplifiers," filed Apr. 30, 1999; U.S. Ser. No.: 09/545,505, entitled "Large Photosensitivity in Lead Silicate Glasses," filed Apr. 7, 2000; U.S. Ser. No.: 09/576,797, entitled "Method for Efficient Coupling of Laser Beams into Waveguides," filed May 23, 2000; U.S. Ser. No.: 60/043, 501, entitled "Modular Assembly for Reagentless Affinity Separation and Detection of Analyte." filed Apr. 11, 1997; U.S. Ser. No.: 60/155,766, entitled "Strong Fiber Bragg Gratings with Significantly Enhanced Thermal Stability." filed Sep. 27, 1999; U.S. Pat. No. : 6,097,867, entitled "Technique for Fabrication of a Poled Electro-Optic Fiber Segment," issued Aug. 1, 2000; U.S. Pat. No. : 5,617,499, entitled "Technique for Fabrication of a Poled Electrooptic Fiber Segment," issued Apr. 1, 1997; U.S. Ser. No.: 60/191, 841, entitled "In-Situ Technique for Accurately Measuring Polished Waveguide Thickness With Respect to Core of the Waveguide," filed Mar. 24, 2000; U.S. Ser. No.: 09/541,021, entitled "Technique for Fabrication of a Poled Electro-Optic Fiber Segment," filed Mar. 31, 2000; and U.S. Ser. No.: 60/230,291, entitled "Wavelength-switchable devices based on stable finely-tunable Fabry-Perot filters," filed Sep. 1, 2000. The entire contents and disclosures of these patents and applications are hereby incorporated by reference.

GOVERNMENT INTEREST STATEMENT

This invention is made with government support under grant number MDA972-98-1-002, awarded by DARPA. The government may have certain rights in this invention.

BACKGROUND OF THE INVENTION

1. Field of the Invention

The present invention relates generally to an apparatus for actively mode-locking a laser using a fiber segment containing Fiber Bragg gratings.

2. Description of the Prior Art

Lasers, which provide a stream of light at a particular frequency (or wavelength, in the case of light), are transformed into energy pulses by a process referred to as mode-locking. These energy pulses can then be directed into fiber cable for use in various applications, such as in telecommunications.

However, fiber lasers, i.e., those lasers used in conjunction with fiber cable, that are passively mode-locked are difficult to precisely synchronize at a particular frequency, such as, for instance, clock frequencies used for signals in the OTDM and WDM channels. Actively mode-locked fiber lasers, on the other hand, offer increased stability which, in turn, provides for a more precise synchronization, i.e., synchronizing optical pulses to external electrical sources. As such, actively mode-locked fiber lasers support greater applications.

The conventional method for actively mode-locking a fiber laser requires an external device. such as an electro-optic modulator ("EOM"), e.g., a lithium niobate waveguide amplitude modulator, physically located between the laser and the fiber, to modulate the amplitude of the incoming laser source and then pass the modulated source into the fiber.

Unfortunately, a result of using external EOMs is that insertion losses occur. In addition, the cost of EOMs becomes more important with the prolific increase in fiber applications, especially those applications that require all-fiber active devices, such as those required by hybrid WDM/OTDM systems. It is therefore highly desirable for a less expensive modulated fiber-laser and for a modulated fiber-laser with decreased insertion loss.

SUMMARY OF THE INVENTION

It is therefore an object of the present invention to provide an improved method for actively mode-locking a fiber laser without utilizing an external EOM.

It is a further object of the present invention to use a fiber cable segment containing a doped gain medium, a first FBG, and a second FBG, wherein a resonant cavity is created so that a fiber laser can be actively mode-locked.

It is yet another object of the present invention wherein the first FBG is a narrowband FBG and the second FBG is an electro-optically tunable FBG.

It is a further object of the present invention wherein the center frequency of the tunable FBG can be adjusted to produce a single mode-locked output frequency.

It is yet another object of the present invention wherein the electro-optically FBG is fabricated by a thermal-poling process.

It is yet another object of the present invention wherein the gain bandwidth of the doped fiber is limited to a frequency range of the width of the wavelength spectrum associated with the doped fiber's intracavity florescence and centered at the center frequency of the narrowband FBG.

It is yet another object of the present invention wherein the fiber laser can be actively mode-locked by biasing the reflection spectrum of the electro-optically tunable FBG at a particular biasing frequency and electro-optically modulating the spectrum at a particular cavity round trip frequency.

It is yet another object of the present invention wherein the first FBG is an electro-optically tunable FBG and the second FBG is an electro-optically tunable FBG, so that any frequency within the wavelength range of the gain spectrum of the doped fiber can be selected to be mode-locked.

It is yet another objection of the present invention wherein the selection of any frequency within the wavelength range of the gain spectrum of the doped fiber can be accomplished by stacking multiple fixed narrowband gratings.

In a first broad aspect, the present inventino provides a fiber segment comprising: a first fiber Bragg grating (FBG) located at a proximal end of the fiber segment; and a second fiber Bragg grating (FBG) located at a distal end of the fiber segment; wherein, when light enters said fiber segment at a first wavelength at said proximal end, a resonant cavity is created between said first FBG and said second FBG, whereby an output is mode-locked at a second wavelength and is produced at said distal end.

In a second broad aspect, the present invention provides a device comprising a plurality of fiber segments, wherein each fiber segment comprises: a doped gain medium; a first fiber Bragg grating (FBG) located at a proximal end of the fiber segment; and a second fiber Bragg grating (FBG) located at a distal end of the fiber segment; wherein, when light enters the fiber segment at a first wavelength at the proximal end, a resonant cavity is created between a first FBG and at least a second FBG, whereby an output is mode-locked at a second wavelength and is produced at the distal end.

In a third broad aspect, the present invention provides a device comprising: a light source; and a fiber segment; wherein the light source is aligned with the fiber segment, and wherein the light source is mode-locked within the fiber segment.

In a fourth broad aspect, the present invention provides a laser comprising: a light source; and a fiber segment; wherein the light source is aligned with the fiber segment, and wherein the laser is mode-locked.

Other objects and features of the present invention will be apparent from the following detailed description of the preferred embodiment.

BRIEF DESCRIPTION OF THE DRAWINGS

This invention will be described in conjunction with the accompanying drawings, in which.

DETAILED DESCRIPTION OF THE PREFERRED EMBODIMENT

Definitions

Figure 1:
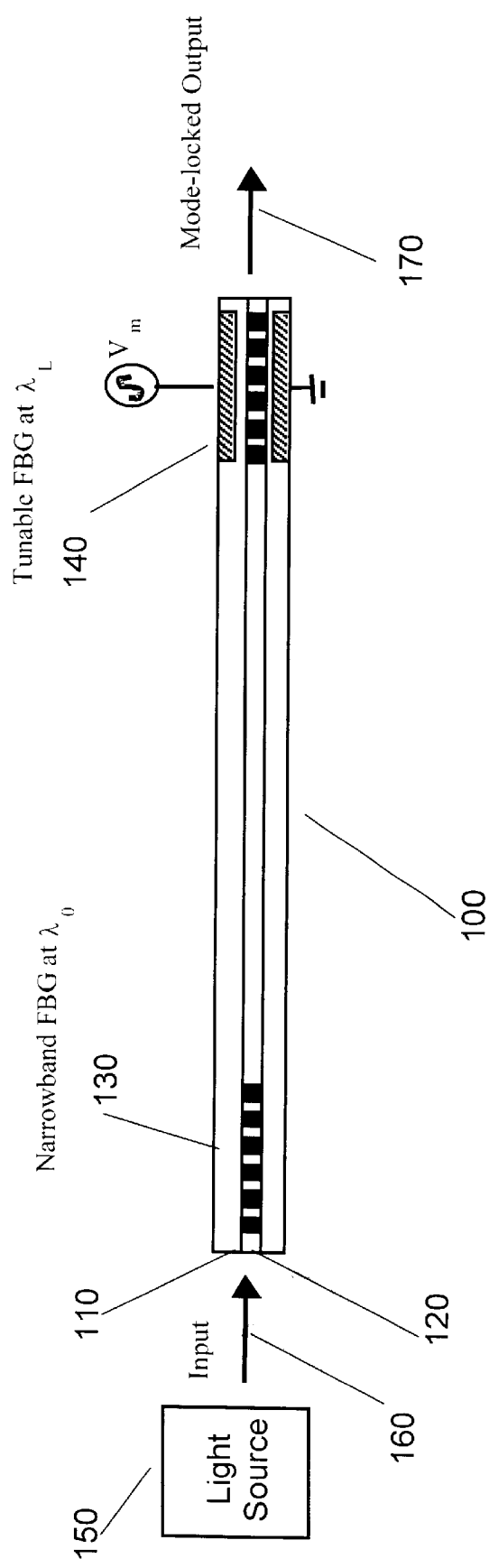
FIG. 1 illustrates an actively mode-locked all fiber laser, constructed in accordance with a preferred embodiment of the invention.

Before a substantive discussion of the preferred embodiment may begin, it is essential to define several key terms.

The term "frequency" and the term "wavelength" are used in this application interchangeably. Although, frequency equals speed divided by wavelength, in fiber applications, the speed of light in a fiber is constant. Therefore, for all intensive purposes, wavelength and frequency are used interchangeably.

The term "dopant" is used in the present invention to mean any extraneous element or combination thereof which is added to a material to enhance or suppress a characteristic of that material. Examples of dopants include, but are not limited to: germanium (Ge), hydrogen (H), holmium (Ho), sodium (Na), lithium (Li), lead (Pb), zirconium (Zr), zinc (Zn), erbium (Er), praseodymium (Pr), thulium (Tm), potassium (K), calcium (Ca), and other atomic or ionic species. The particular characteristics of interest in the present invention are the ability to act as an active or light amplifying material.

The term "Bragg grating" is used in this application to mean a structure containing alternating periodic segments of varying periods of high and low refractive index material segments and/or appropriately embedded phase shift segments at well defined locations of the structure. A period is defined as one set of adjacent high and low refractive material segments. It is understood by this definition that the order of the high and low index materials is irrelevant, only that there is a change in refractive index between adjacent segments. While only uniform gratings are illustrated, non-uniform gratings are also contemplated within the scope of the invention.

The term "fiber optic cable" or "fiber" or "fiber segment" or "fiber optic waveguide" is used in this application to mean any waveguide utilized to guide light waves from one point to another. This definition specifically includes both single mode and multi-mode fibers as well as any waveguide having any cross-sectional shape or any single or multi-clad geometry. In addition, this term also includes any waveguide whether doped or undoped.

The term "gain medium" for the purpose of the present invention refers to a medium that provides gain to the optical signal. Examples of such mediums include, but are not limited to doped fiber optic waveguides or semiconductor optical amplifiers. There are a multitude of dopants that can be used to create a gain medium within a fiber segment (see the above definition of the term dopant).

The term "input voltage" is used in this application to mean any voltage that is applied to the devices discussed below. In particular embodiments, specific voltages are used. Examples of these voltages include, but are not limited to: a DC voltage, an AC voltage, and pulsed voltage.

The term "ITU grid" for the purposes of the present invention refers to a standard grid of WDM channels: discrete set of pre-designed wavelengths that are: (1) used as optical carriers of information (i.e., wavelength channels separated by 100 GHz in the ITU DWDM grid), or (2) used as signals for the control, generation, routing, and supervision of the above-mentioned optical carrier wavelength channels. The relationship between wavelengthcarrier and wavelengthcontrol is illustrated in the case of wavelength conversion through FWM (four wave mixing) in semiconductor optical amplifiers. In this example, the pump wavelengths are the control wavelengths i.e., wavelengthpump, while the source and target wavelengths are the carrier wavelengths, i.e., wavelengthcarrier.

Description

The conventional method for actively mode-locking a fiber laser requires an external device, such as an electro-optic modulator ("EOM"), e.g., a lithium niobate waveguide amplitude modulator, physically located between the laser and the fiber, to modulate the amplitude of the incoming laser source and then pass the modulated source into the fiber.

Unfortunately, a result of using external EOM's is that insertion loss occurs. In addition, the cost of EOM's becomes more important with the prolific increase in fiber applications, such as those required by hybrid WDM/OTDM systems. It is therefore highly desirable to provide a less expensive method to modulate fiber-lasers and for a method with decreased insertion loss.

The present invention provides a fiber segment that is able to directly input a laser light source and internally modulate an input wavelength associated with the light source, thereby creating an output having a modulated wavelength. This all-fiber mode-locking fiber segment does not utilize an external electro-optic modulator, rather the modulation or mode-locking is accomplished internal to the fiber. This all-fiber active mode-locking fiber segment has tremendous application value in the growing area of all-fiber active devices for both WDM and OTDM applications. For example, mode-locked all-fiber lasers whose bandwidths are centered at specific WDM channel wavelengths in the 1.55 $\mu$m ITU grid are highly desirable for hybrid WDM/OTDM systems. In addition, passively mode-locked lasers are difficult to synchronize precisely to the clock frequencies used for signals in the OTDM channels. As such, actively mode-locked all-fiber lasers, whose center wavelengths correspond to specific WDM channels, are highly desirable.

As illustrated in FIG. 1, a fiber segment 100 comprises a cladding 110 and a core 120. Disposed at a proximal end of fiber segment 100 is a first fiber Bragg grating (FBG) 130 and at a distal end, a second FBG 140 is disposed. In a preferred embodiment, FBG 140 is tunable so that a resonant cavity 132 is created between FBG's 130, 140. First FBG 130 is preferably a narrowband grating. It should be appreciated that by utilizing the structure, described above, mode-locking is achieved without the need for an external modulator. A light source 155 (e.g., a laser) injects light into fiber segment 100 at the fiber segment's 100 input 160. The light first encounters the first FBG 130. The light is injected at a predetermined wavelength. The light, after being mode-locked, exits after second FBG 140 at output point 170 at a second desired wavelength.

In an alternative embodiment. light source 155 and fiber Segment 100 may he combined within a laser, thus providing an active mode-locking all-fiber laser.

In a preferred embodiment, fiber segment 100 is doped with a dopant such as Er. The term "dopant" is used in the present invention to mean any extraneous element or combination thereof which is added to a material to enhance or suppress a characteristic of that material. Examples of dopants include, but are not limited to: germanium (Ge), hydrogen (H), holmium (Ho), sodium (Na), lithium (Li), lead (Pb), zirconium (Zr), zinc (Zn), erbium (Er), praseodymium (Pr), thulium (Tm), potassium (K), calcium (Ca), and other atomic or ionic species. The particular characteristics of interest in the present invention are the ability to act as an active or light amplifying material and to conduct cross relaxation between ions of the dopant, or energy transfer between the dopant and sensitizer ions. In a preferred embodiment, the gain bandwidth of fiber segment 100 is limited to a frequency range ($\delta v$), which is the width of the wavelength spectrum associated with the doped fiber's, intracavity florescence and which is centered at wavelength ($\lambda_o$), which is the center frequency of the reflection spectrum of first FBG 130. By biasing the reflection spectrum of second FBG 140 at a biasing frequency ($\lambda_L$), and electro-optically modulating the spectrum at the cavity round-trip frequency, fiber segment 100 may be actively mode-locked. Because second FBG 140 is tunable, the reflection spectrum of FBG 140 may be adjusted to have a center frequency at a desired wavelength.

Figure 2:
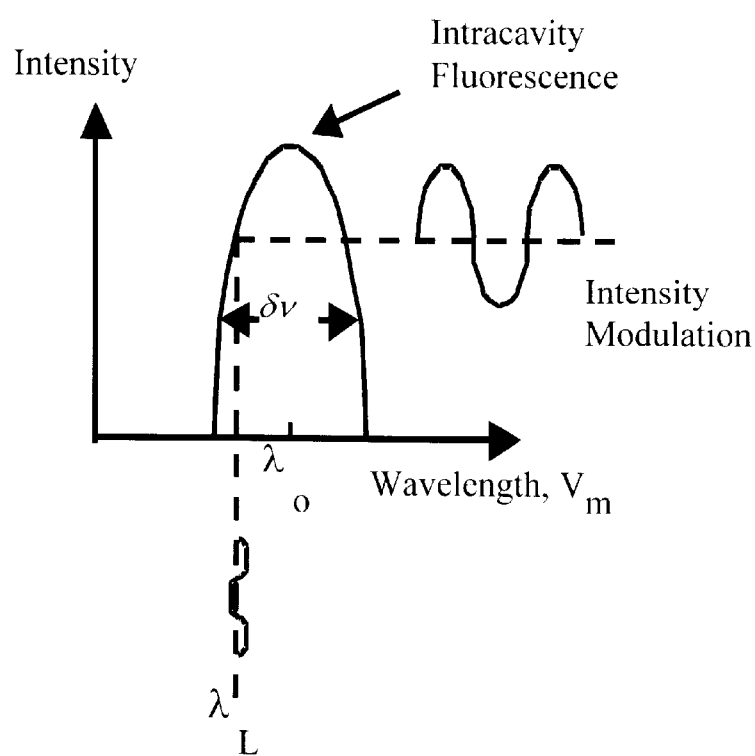
FIG. 2 is a graphical relationship between intensity and wavelength which is the basis for calculating the frequency by which to bias the reflection spectrum of the tunable FBG (i.e., the second FBG)

Biasing frequency is determined by the equation:

$$\lambda_L = \lambda_0 + \delta v/2$$

Where $\lambda_o$ is defined as the center frequency of the reflection spectrum of FBG 130 and $\delta v$ is defined as width of the wavelength spectrum associated with the intracavity florescence. The relationship between these variables is illustrated in FIG. 2.

The cavity round trip frequency is defined by the equation:

$$c/2nL$$

Where "c" is the speed of light; "n" is defined as the mean refractive index of the fiber core; and "L" is defined as the length of the FBG.

In an alternative embodiment of the present invention, the tunable FBG 140, is an electro-optically tunable FBG. In another alternative embodiment, the tunable FBG 140 is an electro-optically tunable FBG, wherein the FBG is fabricated using a thermal poling process, as outlined in U.S. patent application Ser. No. 6,097,867, which issued Aug. 1, 2000, and is entitled "Technique For Fabrication Of A Poled Electro-Optic Fiber Segment," the entire contents and disclosure of which is hereby incorporated by reference.

Figure 3:
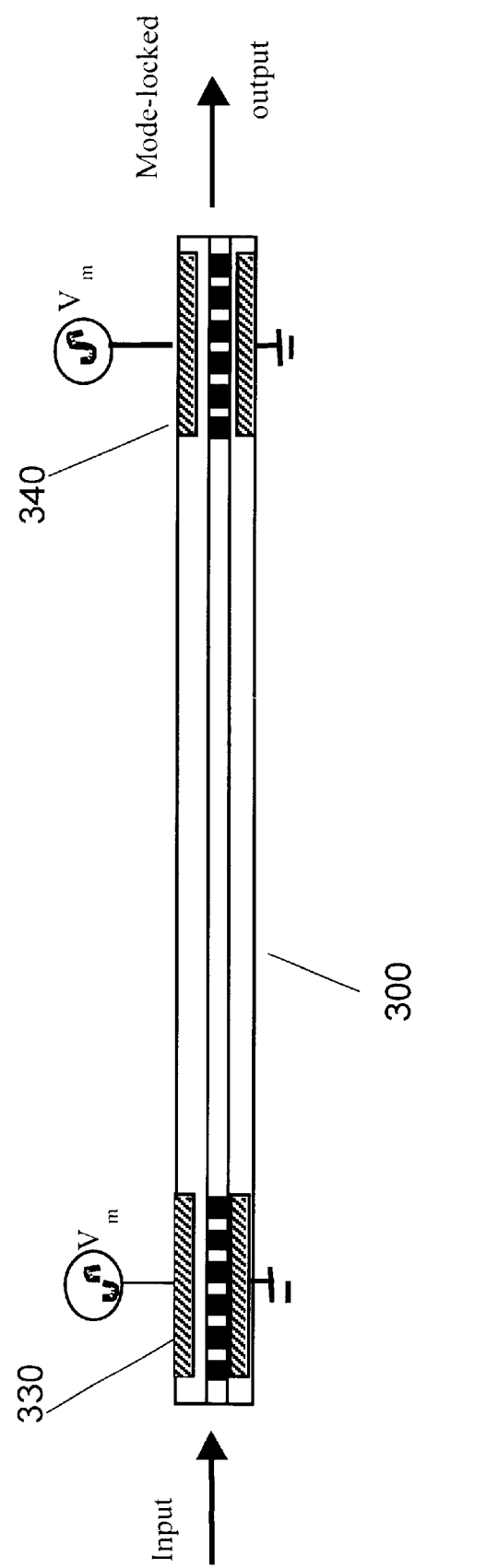
FIG. 3 illustrates an actively mode-locked all fiber laser, constructed in accordance with an alternate embodiment of the invention, wherein both FBGs are tunable.

In an alternative embodiment of the present invention, as illustrated in FIG. 3, the fiber segment 300 includes two tunable FBG's 330, 340. Tunable FBG 330 is disposed at a proximal end of fiber segment 300 and Tunable FBG 340 disposed at a distal end. Such a configuration allows the selection of any wavelength range within the gain spectrum of the doped fiber.

In another alternative embodiment of the present invention, the selection of any wavelength with the gain spectrum of the doped fiber may occur when multiple fixed narrowband gratings are stacked. In this particular embodiment, a plurality of fiber segments, as illustrated in FIG. 1, are stacked in parallel.

In an alternative embodiment of the present invention, the fixed narrowband gratings are stacked at an ITU grid, thereby making this configuration highly desirable as a source for WDM/TDM systems. Another benefit to this stacked configuration is that both the depth of modulation and the amplitude of the mode-locked pulses may by optimized.

Example 1

In experiments, hydrogen-loaded (100 atm., 50° C., 2 days) D-shaped fibers (KVH Corp., 2×4 $\mu$m elliptical core with 15% $GeO_2$) were used for the Bragg grating fabrication. The fiber was exposed to 193 nm pulses from an ArF excimer laser (20 mJ/cm$^2$/pulse, 10 Hz rep rate, 20 mJ/pulse in a 1 cm$^2$ beam) for 20 mins through a phase mask having a period of 1072 nm. Two different FBGs were fabricated using this setup. One of them (FBG #1) had a 13 dB reflectivity and a 500 pm 3 dB bandwidth (estimated length, L=3 mm), whereas the other gratin (FBG #2) had a 12 dB reflectivity and a 300 pm 3-dB bandwidth (estimated L=5 mm). The FBGs were pre-annealed at 300° C., to provide stabilization. After annealing, the reflectivity of FBG #1 was 9 dB and that of FBG #2 was 7 dB. The flat side of the fiber was subsequently polished to a smooth surface whose distance from the core was approximately 5 $\mu$m, and the polished fiber was then poled at 260° C. and 3.3 kV (the final inter-electrode distance D for the polished fiber was ~70 $\mu$m).

Figure 4:
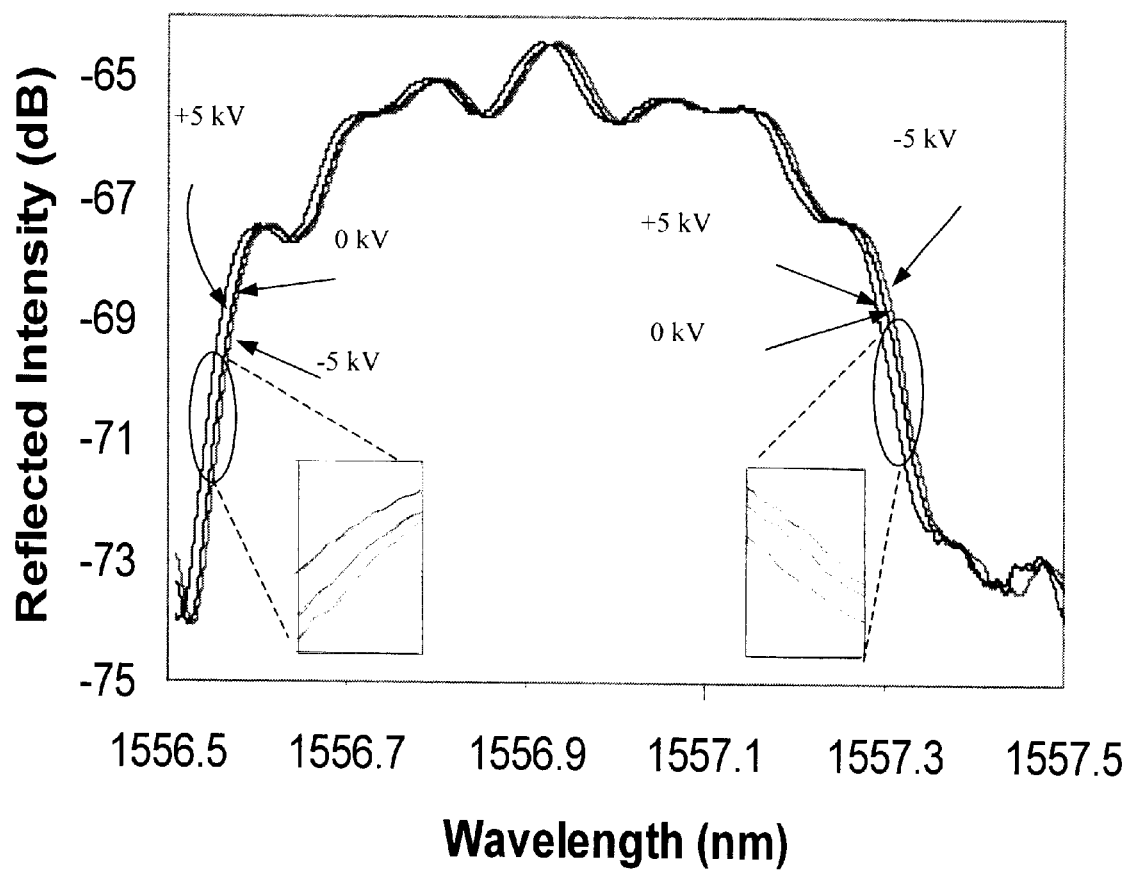
FIG. 4 illustrates the reflectivity spectra for the first FBG, constructed in accordance with another preferred embodiment of the invention, wherein the reflectivity intensity (dB) is plotted against wavelength (nm), which shows asymmetric shifts of 10 pm and 3 pm respectively for 5 kV applied voltage using positive and negative polarities.

The reflection spectra of FBG#1 is shown in FIG. 4 For an applied voltage of +5 kV (anode on the flat side of the D-shaped fiber), we observed a spectral shift of 10 pm, corresponding to an electro-optic coefficient of 0.06 pm/V. In order to verify that the spectral shift did not occur due to the piezoclectric effect or due to heating, the polarity of the electrodes were switched and a spectral shift in the opposite direction was observed. Thus, confirming the electro-optic tuning mechanism. The spectral shift observed for −5 kV (cathode on the flat side of the fiber) was only ~3 pm. Such a result is presumably due to the polarity of the applied field matching that of the "frozen-in" electric field for the positive polarity, and canceling the effect of the "frozen-in" electric field for the negative polarity.

Figure 5:
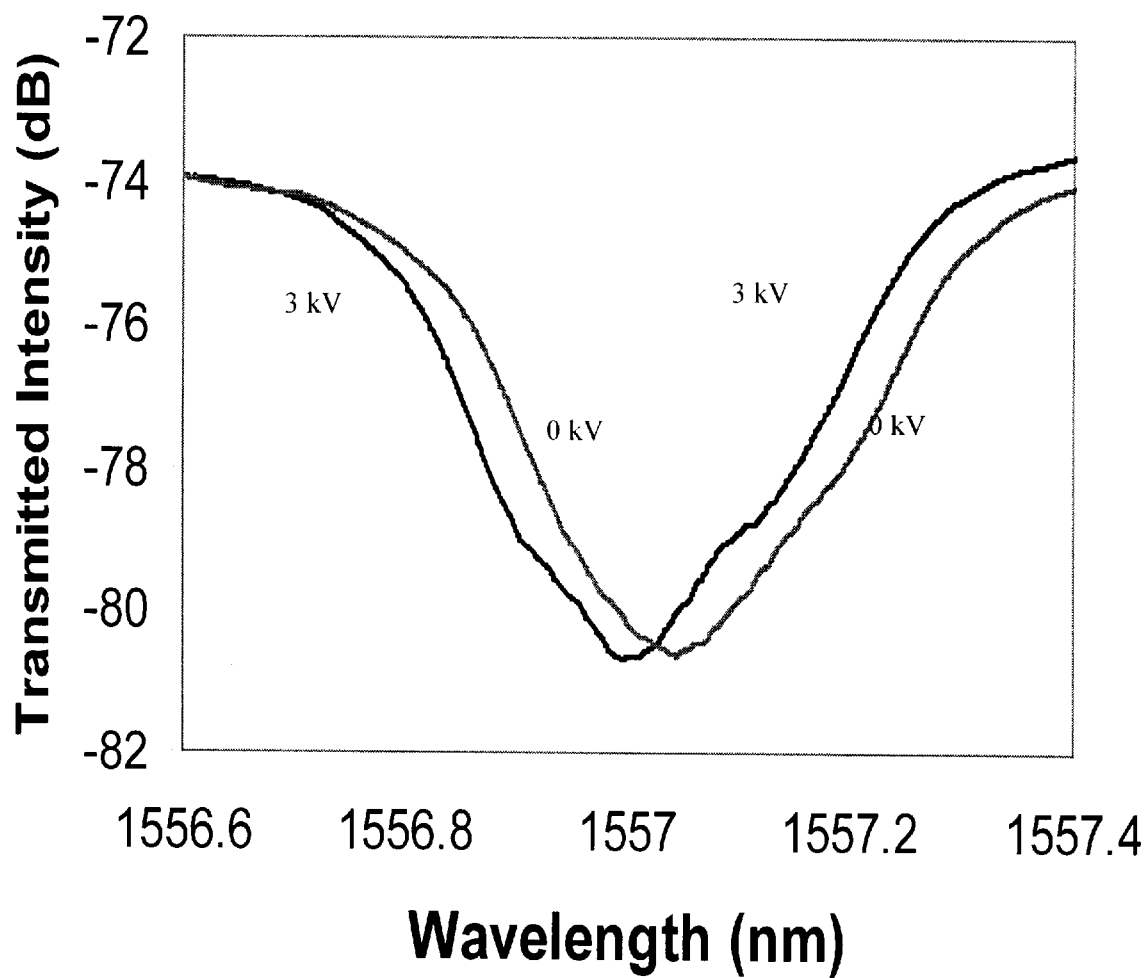
FIG. 5 illustrates the transmission spectra for the second FBG, constructed in accordance with another preferred embodiment of the invention, wherein the transmitted intensity (dB) is plotted against wavelength (nm), which shows a 40 pm shift with an applied voltage of +3 kV.

In recent experiments, a lithographically deposited a 16 μm wide electrode was deposited on the flat side of the D-shaped fiber containing FBG #2. FIG. 5 illustrates the transmission spectrum of this Bragg grating for two values of the applied voltage. For an applied DC voltage of 3 kV, we observe a shift of ~40 pm (5 GHz) in the Bragg grating spectrum.

The spectral shift ($\Delta\lambda$) for a FBG whose reflectivity spectrum is centered at $\lambda_B$ is given by:

$$\Delta\lambda = \lambda_B \frac{\Delta n}{n}$$

where n is the mean refractive index of the fiber core and $\Delta n$ is expressed as:

$$\Delta n = \frac{1}{2} r n^3 \frac{V_t}{D}$$

where r is the electro-optic coefficient, D is the thickness of the D-shaped fiber, and $V_t$ is the tuning voltage applied to the electrodes. The above observation of a wavelength shift of 40 pm for a tuning voltage of 3 kV corresponds to an electro-optic coefficient, r=0.25 pm/V. Since previous reports of thermal poling in bulk glasses suggest that r=1 pm/V is achievable using poling voltages of >5 kV.

Although the present invention has been fully described in conjunction with the preferred embodiment thereof with reference to the accompanying drawings, it is to be understood that the various changes and modifications may be apparent to those skilled in the art. Such changes and modifications are to be understood as included within the scope of the present invention as defined by the appended claims, unless they depart therefrom.

What is claimed is:

1. A fiber segment comprising:
   a first fiber Bragg grating (FBG) located at a proximal end of said fiber segment; and
   a second fiber Bragg grating (FBG) located at a distal end of said fiber segment; wherein said second FBG is tunable by application of a voltage across said FBG and wherein, when light enters said fiber segment at a first wavelength at said proximal end, a resonant cavity is created between said first FBG and said second FBG, whereby an output is mode-locked at a second wavelength and is produced at said distal end by biasing the reflection spectrum of said second FBG at a biasing frequency and electro-optically modulating the spectrum at the cavity round-trip frequency.

2. The fiber segment recited in claim 1, wherein said first FBG is a narrowband FBG.

3. The fiber segment recited in claim 1, wherein said second FBG is electro-optically tunable.

4. The fiber segment recited in claim 3, wherein said electro-optically tunable FBG is fabricated by a thermal-poling process.

5. The fiber segment recited in claim 1, wherein said first FBG is tunable.

6. The fiber segment recited in claim 5, wherein said fiber segment further comprises a doped gain medium and wherein said output has a wavelength within the spectrum of said doped gain medium's wavelength range.

7. The fiber segment recited in claim 1, wherein said first FBG is electro-optically tunable.

8. The fiber segment recited in claim 1, wherein said first FBG is electro-optically tunable and said second FBG is electro-optically tunable.

9. The fiber segment recited in claim 8, wherein said fiber segment further comprises a doped gain medium and wherein said output has a wavelength within the spectrum of said doped gain medium's wavelength range.

10. The fiber segment recited in claim 1, wherein said second wavelength is pre-determinable by specifically modifying the voltage applied across said second FBG.

11. The fiber segment recited in claim 1, wherein said first wavelength is unknown.

12. The fiber segment recited in claim 1, wherein the center frequency of said second FBG produces a single mode-locked second wavelength.

13. The fiber segment recited in claim 1, wherein said fiber segment further comprises a doped gain medium.

14. The fiber segment recited in claim 13, wherein said doped gain medium's gain bandwidth is limited to a frequency range of the width of the wavelength spectrum associated with said doped fiber segment's intracavity fluorescence.

15. The fiber segment recited in claim 13, wherein said doped gain medium's gain bandwidth is centered at said first FBG's reflection spectrum's center frequency.

16. The fiber segment recited in claim 1, wherein said fiber segment is doped with erbium (Er).

17. The fiber segment recited in claim 1, wherein said fiber segment is doped with ionic species.

18. The fiber segment recited in claim 1, wherein said fiber segment is doped with atomic species.

19. The fiber segment recited in claim 1, wherein said fiber segment is doped with a dopant selected from the group consisting of germanium (Ge); hydrogen (H); holmium (Ho); sodium (Na); lithium (Li); lead (Pb); zirconium (Zr); zinc (Zn); praseodymium (Pr); thulium (Tm); potassium (K); calcium (Ca), and any combination thereof.

20. The fiber segment recited in claim 1, wherein said biasing frequency equals: $\lambda_0 + \delta v/2$; wherein:
   $\lambda_0$ is the center frequency of the reflection spectrum of said first FBG; and
   $\delta v$ is the width of the wavelength spectrum associated with said doped fiber's intracavity fluorescence.

21. The fiber segment recited in claim 1, wherein said cavity round trip frequency equals: c/2nL; wherein:
   c is the speed of light;
   n is the mean refractive index of said fiber segment's fiber core; and
   L is the length of the said second FBG.

22. A device comprising a plurality of fiber segments, wherein each fiber segment comprises:
   a doped gain medium;
   a first fiber Bragg grating (FBG) located at a proximal end of said fiber segment; and
   a second fiber Bragg grating (FBG) located at a distal end of said fiber segment; wherein said second FBG is tunable by application of a voltage across said FBG and wherein, when light enters said fiber segment at a first wavelength at said proximal end, a resonant cavity is created between a first FBG and at least a second FBG, whereby an output is mode-locked at a second wavelength and is produced at said distal end by biasing the reflection spectrum of said second FBG at a biasing frequency and electro-optically modulating the spectrum at the cavity round-trip frequency.

23. The fiber segment recited in claim 22, wherein said plurality of said fiber segments are stacked in parallel.

24. The fiber segment recited in claim 23, wherein said output has a wavelength within the spectrum of said doped gain medium's wavelength range.

25. A device comprising:

a laser light source; and a fiber segment; wherein said fiber segment comprises a first fiber Bragg grating (FBG) located at a proximal end of said fiber segment and a second fiber Bragg grating (FBG) located at a distal end of said fiber segment, wherein said second FBG is tunable by application of a voltage across said FBG, and wherein said laser light source is aligned with said fiber segment and mode-locked within said fiber segment by biasing the reflection spectrum of said second FBG at a biasing frequency and electro-optically modulating the spectrum at the cavity round-trip frequency.

26. The device of claim 25, wherein, when said laser light source's light enters said fiber segment at a first wavelength at said proximal end, a resonant cavity is created between said first FBG and said second FBG, whereby an output is mode-locked at a second wavelength and is produced at said distal end.

27. The device recited in claim 26, wherein said first FBG is a narrowband FBG.

28. The device recited in claim 26, wherein said second FBG is electro-optically tunable.

29. The device recited in claim 28, wherein said electro-optically tunable FBG is fabricated by a thermal-poling process.

30. The device recited in claim 26, wherein said first FBG is tunable.

31. The device recited in claim 26, wherein said first FBG is electro-optically tunable.

32. The device recited in claim 26, wherein said first FBG is electro-optically tunable and said second FBG is electro-optically tunable.

33. The device recited in claim 26, wherein said second wavelength is pre-determinable by specifically modifying the voltage applied across said second FBG.

34. The device of claim 32, wherein said device is a fiber laser.

* * * * *